(12) United States Patent
Xu et al.

(10) Patent No.: US 11,166,021 B2
(45) Date of Patent: Nov. 2, 2021

(54) METHODS AND APPARATUSES FOR CODING AND DECODING MODE INFORMATION AND ELECTRONIC DEVICE

(71) Applicant: FUJITSU LIMITED, Kawasaki (JP)

(72) Inventors: Zhanglei Xu, Beijing (CN); Jianqing Zhu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/797,750

(22) Filed: Feb. 21, 2020

(65) Prior Publication Data
US 2020/0236360 A1 Jul. 23, 2020

Related U.S. Application Data

(63) Continuation of application No. PCT/CN2017/114781, filed on Dec. 6, 2017.

(51) Int. Cl.
*H04N 7/12* (2006.01)
*H04N 19/12* (2014.01)
(Continued)

(52) U.S. Cl.
CPC ........... *H04N 19/12* (2014.11); *H04N 19/119* (2014.11); *H04N 19/176* (2014.11); *H04N 19/184* (2014.11)

(58) Field of Classification Search
CPC .... H04N 19/119; H04N 19/12; H04N 19/176; H04N 19/184; H04N 19/647;
(Continued)

(56) References Cited

U.S. PATENT DOCUMENTS 6,154,569 A * 11/2000 Sakaue ............... G06T 9/00
382/233
2007/0177814 A1* 8/2007 Wu ............... H04N 19/184
382/245
(Continued)

FOREIGN PATENT DOCUMENTS

CN 103190147 A 7/2013
CN 103220508 A 7/2013
(Continued)

OTHER PUBLICATIONS

Written Opinion and International Search Report dated Aug. 23, 2018 in corresponding International Patent Application No. PCT/CN2017/114781 (8 pages) (2 pages English Translation).
(Continued)

*Primary Examiner* — Gims S Philippe
(74) *Attorney, Agent, or Firm* — Staas & Halsey, LLP

(57) ABSTRACT

Methods and apparatuses for coding and decoding mode information and electronic device. The method for coding includes determining a uniform transform block mode adopted by a coding block of an image; determining a binary bit to which the uniform transform block mode corresponds according to a size of the coding block and/or a determined number of uniform transform block modes; and coding the binary bit to which the uniform transform block mode corresponds into a bit stream of the image. Hence, for example, not only uniform transform block mode information may be coded and decoded, but also bit costs of coding may be lowered.

18 Claims, 8 Drawing Sheets

(51) Int. Cl.
*H04N 19/119* (2014.01)
*H04N 19/176* (2014.01)
*H04N 19/184* (2014.01)

(58) Field of Classification Search
CPC .. H04N 19/132; H04N 19/139; H04N 19/142; H04N 19/157; H04N 19/13; H04N 19/103; H04N 19/70
USPC .................................................. 375/240.02
See application file for complete search history.

(56) References Cited

U.S. PATENT DOCUMENTS

| | | | |
|---|---|---|---|
| 2011/0243244 | A1 | 10/2011 | Min et al. |
| 2012/0106649 | A1 | 5/2012 | Wang et al. |
| 2012/0230396 | A1* | 9/2012 | Cohen .................. H04N 19/467 375/240.03 |
| 2012/0320972 | A1* | 12/2012 | Ma ......................... H04N 19/88 375/240.03 |
| 2013/0039417 | A1 | 2/2013 | Wang et al. |
| 2014/0098862 | A1 | 4/2014 | Yang et al. |
| 2015/0208094 | A1 | 7/2015 | Lee et al. |
| 2016/0360198 | A1 | 12/2016 | Chang |
| 2017/0013270 | A1 | 1/2017 | Okajima et al. |
| 2018/0098074 | A1 | 4/2018 | Heo et al. |
| 2018/0176601 | A1* | 6/2018 | Jeong .................. H04N 19/593 |
| 2019/0089969 | A1* | 3/2019 | Han ....................... H04N 19/86 |

FOREIGN PATENT DOCUMENTS

| | | |
|---|---|---|
| CN | 103733628 A | 4/2014 |
| CN | 104902276 A | 9/2015 |
| CN | 105933718 A | 9/2016 |
| CN | 106134192 A | 11/2016 |
| EP | 2557792 A1 | 2/2013 |
| JP | 2013-524677 A | 6/2013 |
| JP | 2013-546257 A | 12/2013 |
| WO | WO 2014/146219 A1 | 9/2014 |
| WO | WO 2016/153146 A1 | 9/2016 |

OTHER PUBLICATIONS

Shanshan Xu; "Optimization of entropy coding in HEVC with CUDA"; Beijing Institute of Technology; Jan. 2015; (20 pages).

Xiaoyin CHE; "Research on Intra Prediction and Entropy Coding Technology Oriented the Next Generation of Video Coding Standard"; Beijing University of Technology; Jun. 2012; UDC: 004; TP391; 10005; S200907018; (20 pages).

Extended European Search Report dated Feb. 12, 2021 in related European Patent Application No. 17933935.3 (9 pages).

Canadian Office Action dated Apr. 9, 2021 in related Canadian Patent Application No. 3,074,127 (11 pages).

First Examination Report dated Feb. 24, 2021 in related Indian Patent Application No. 202037007637 (6 pages).

Notice of Reasons for Refusal dated Mar. 23, 2021 in related Japanese Patent Application No. 2020-511238 (5 pages) (5 pages English Translation).

Notice of Preliminary Rejection by the Korean Intellectual Property Office issued for corresponding Korean Patent Application No. 10-2020-7005355 dated Jul. 26, 2021 (4 pages) (4 pages English Translation).

* cited by examiner

METHODS AND APPARATUSES FOR CODING AND DECODING MODE INFORMATION AND ELECTRONIC DEVICE

CROSS-REFERENCE TO RELATED APPLICATIONS

This application is a continuation application claiming a benefit under 35 USC 120 of PCT International Application PCT/CN2017/114781, filed on Dec. 6, 2017, in the China National Intellectual Property Administration, the entire contents of which are incorporated herein by reference.

TECHNICAL FIELD

This disclosure relates to the field of video image technologies, and in particular to methods and apparatuses for coding and decoding mode information and an electronic device.

BACKGROUND

In video coding (also referred to as image coding) standards (such as MPEG 2, H.264/AVC, H.265/HEVC), for an image region to be coded, such as a coding unit (CU), which may also be referred to as a coding block (CB), corresponding information (such as palette information, index information, prediction information, etc.) may be subjected to bit stream coding, which may lower bit cost of coding.

At present, in order to further lower bit cost, a CU may further be divided and transformed to form one or more transform units (TUs), which may also be referred to as transform blocks (TBs). For example, the CU may be divided into one or more TUs having identical sizes, and such a structure may be referred to as a uniform transform unit (UTU) structure.

For a UTU structure, a height and width of each TU may be identical. That is, the TU may be of a square shape, and a size of the TU may be, for example, 2N×2N, N×N, 1/2N×1/2N (a unit of which may be, for example, pixels× pixels, or sampling points×sampling points), and so on. And furthermore, different UTU modes may be used to divide the CU differently.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in encoding, information of a UTU mode needs to be coded into a bit stream, so that an image may be decoded according to the UTU mode in decoding. However, there is currently no corresponding technical solution on how to code and decode UTU mode information.

Embodiments of this disclosure provide methods and apparatuses for coding and decoding mode information and an electronic device, in which UTU mode information may be coded and decoded, and bit cost of coding may be lowered.

According to a first aspect of the embodiments of this disclosure, there is provided a method for coding mode information, including: determining a uniform transform unit mode adopted by a coding unit of an image; determining one or more binary bits to which the uniform transform unit mode corresponds according to a size of the coding unit and/or a predetermined number of uniform transform unit modes; and coding the binary bits to which the uniform transform unit mode corresponds into a bit stream of the image.

According to a second aspect of the embodiments of this disclosure, there is provided an apparatus for coding mode information, including: a mode determining portion configured to determine a uniform transform unit mode adopted by a coding unit of an image; a bit determining portion configured to determine one or more binary bits to which the uniform transform unit mode corresponds according to a size of the coding unit and/or a predetermined number of uniform transform unit modes; and a bit stream coding portion configured to code the binary bits to which the uniform transform unit mode corresponds into a bit stream of the image.

According to a third aspect of the embodiments of this disclosure, there is provided a method for decoding mode information, including: acquiring one or more binary bits to which a uniform transform unit mode corresponds from a bit stream of an image according to a size of a coding unit of the image and/or a predetermined number of uniform transform unit modes; and determining the uniform transform unit mode adopted by the coding unit according to the binary bits to which uniform transform unit mode corresponds.

According to a fourth aspect of the embodiments of this disclosure, there is provided an apparatus for decoding mode information, including: a bit acquiring portion configured to acquire one or more binary bits to which a uniform transform unit mode corresponds from a bit stream of an image according to a size of a coding unit of the image and/or a predetermined number of uniform transform unit modes; and a mode determining portion configured to determine the uniform transform unit mode adopted by the coding unit according to the binary bits to which uniform transform unit mode corresponds.

According to a fifth aspect of the embodiments of this disclosure, there is provided an electronic device, including: a coder including the apparatus for coding mode information as described in the second aspect; and/or a decoder including the apparatus for decoding mode information as described in the fourth aspect.

An advantage of the embodiments of this disclosure exists in that the binary bits to which the UTU mode corresponds are determined according to the size of the coding unit (CU) and/or a predetermined number of uniform transform unit (UTU) modes. Hence, not only uniform transform unit mode information may be coded and decoded, but also bit costs of coding may be lowered.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

Figure 1:
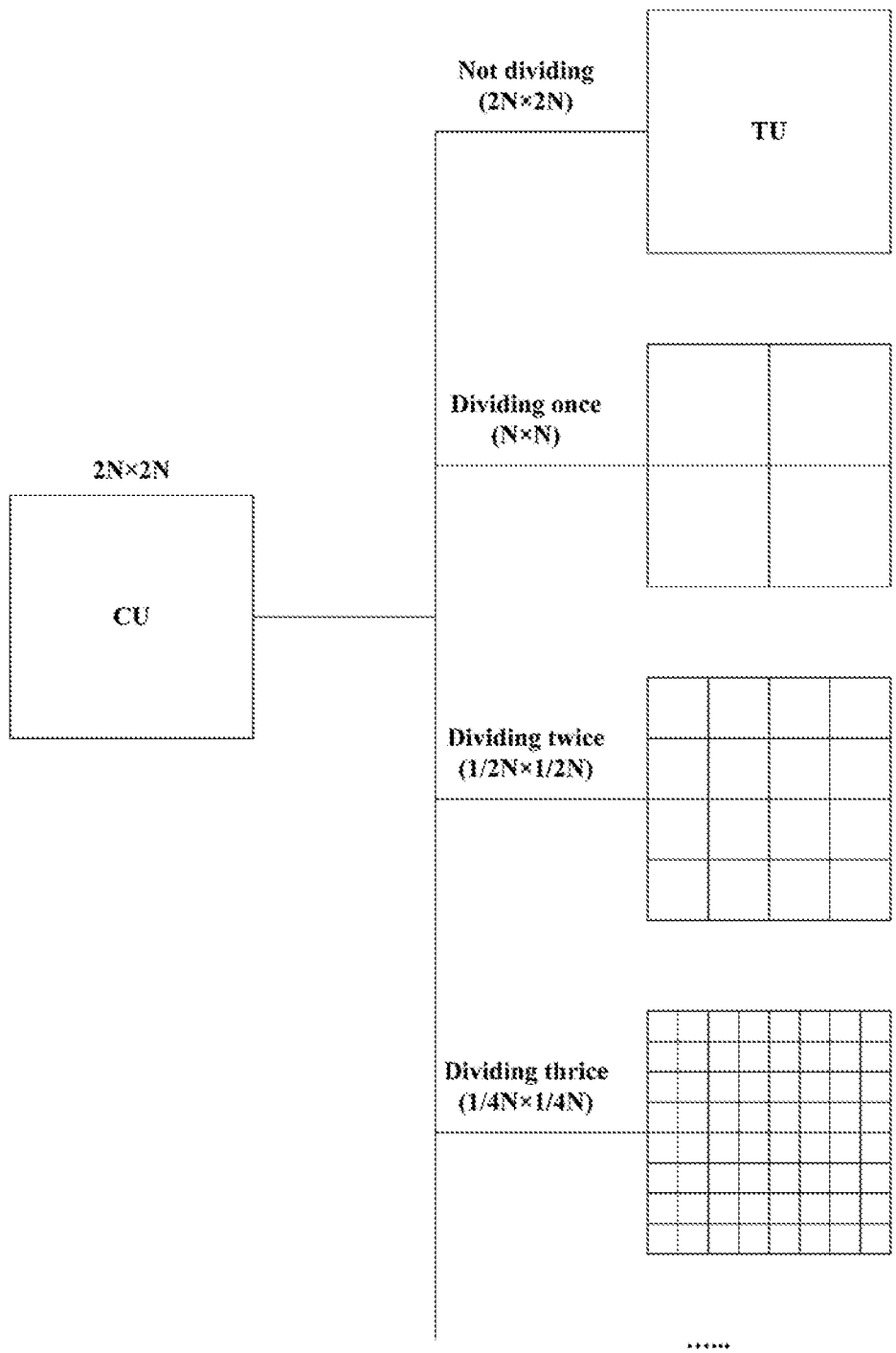
FIG. 1 is an exemplary diagram of a square CU of a UTU structure that is divided into one or more TUs.

In a UTU structure, a CU may be divided into one or more TUs, and all TUs have identical sizes. FIG. 1 is an exemplary diagram of a square CU of a UTU structure that is divided into one or more TUs. As shown in FIG. 1, the size of the CU is 2N×2N, which may be directly divided into a 2N×2N TU (which may be referred to as being undivided), or it may also be divided into four N×N TUs (may be referred to as being divided once), or it may also be divided into sixteen 1/2N×1/2N TUs (may be referred to as being divided twice), or it may also be divided into sixty-four 1/4N×1/4N TUs (may be referred to as being divided thrice), and so on, until an allowed smallest TU size (such as 4 sampling points×4 sampling points in HEVC).

Figure 2:
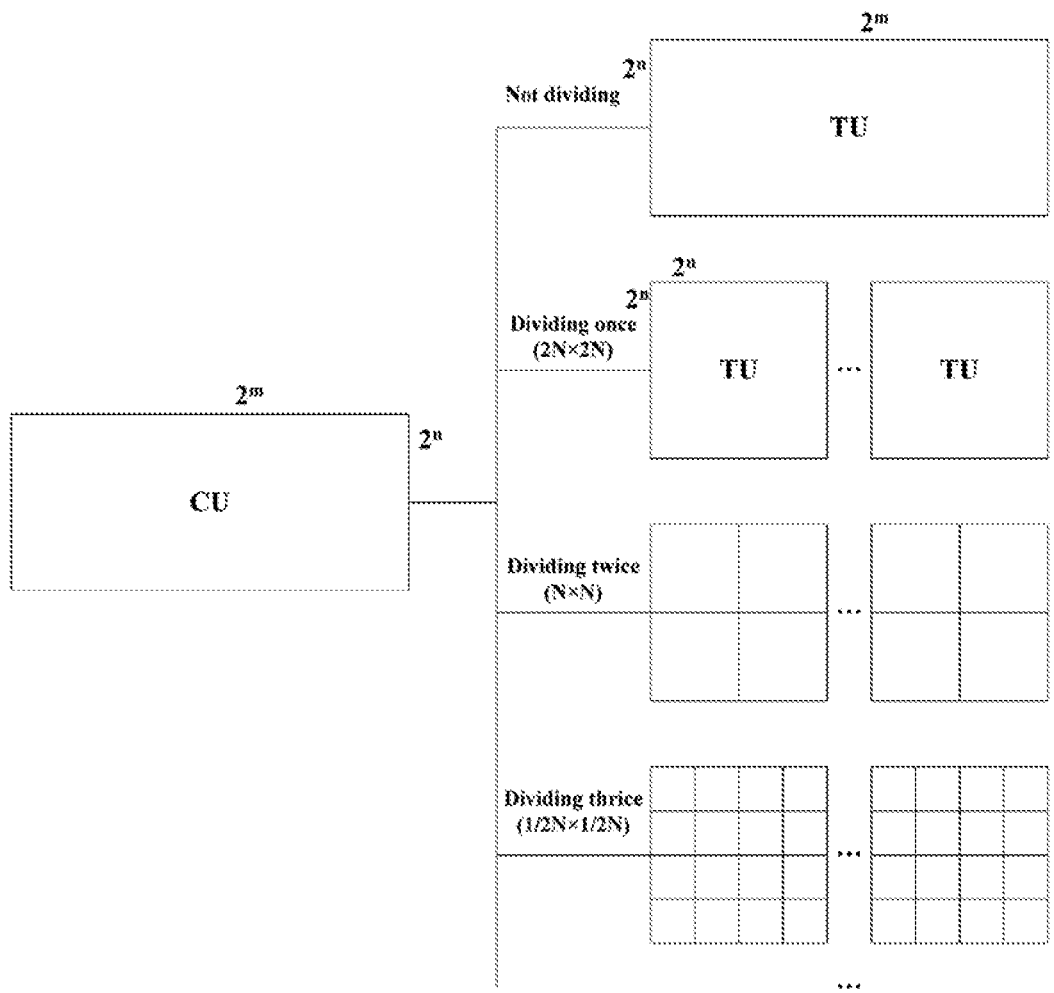
FIG. 2 is an exemplary diagram of a non-square CU of a UTU structure that is divided into one or more TUs.

FIG. 2 is an exemplary diagram of a non-square CU of a UTU structure that is divided into one or more TUs. As shown in FIG. 2, a size of the CU is $2^m \times 2^n$ (m>n), which may be directly divided into a $2^m \times 2^n$ TU (which may be referred to as being undivided), or it may also be divided into $2^{m-n}$ 2N×2N TUs (may be referred to as being divided once), or it may also be divided into $4 \times 2^{m-n}$ N×N TUs (may be referred to as being divided twice), or it may also be divided into $16 \times 2^{m-n}$ 1/2N×1/2N TUs (may be referred to as being divided thrice), and so on, until an allowed smallest TU size (such as 4×4 in HEVC).

Figure 3:
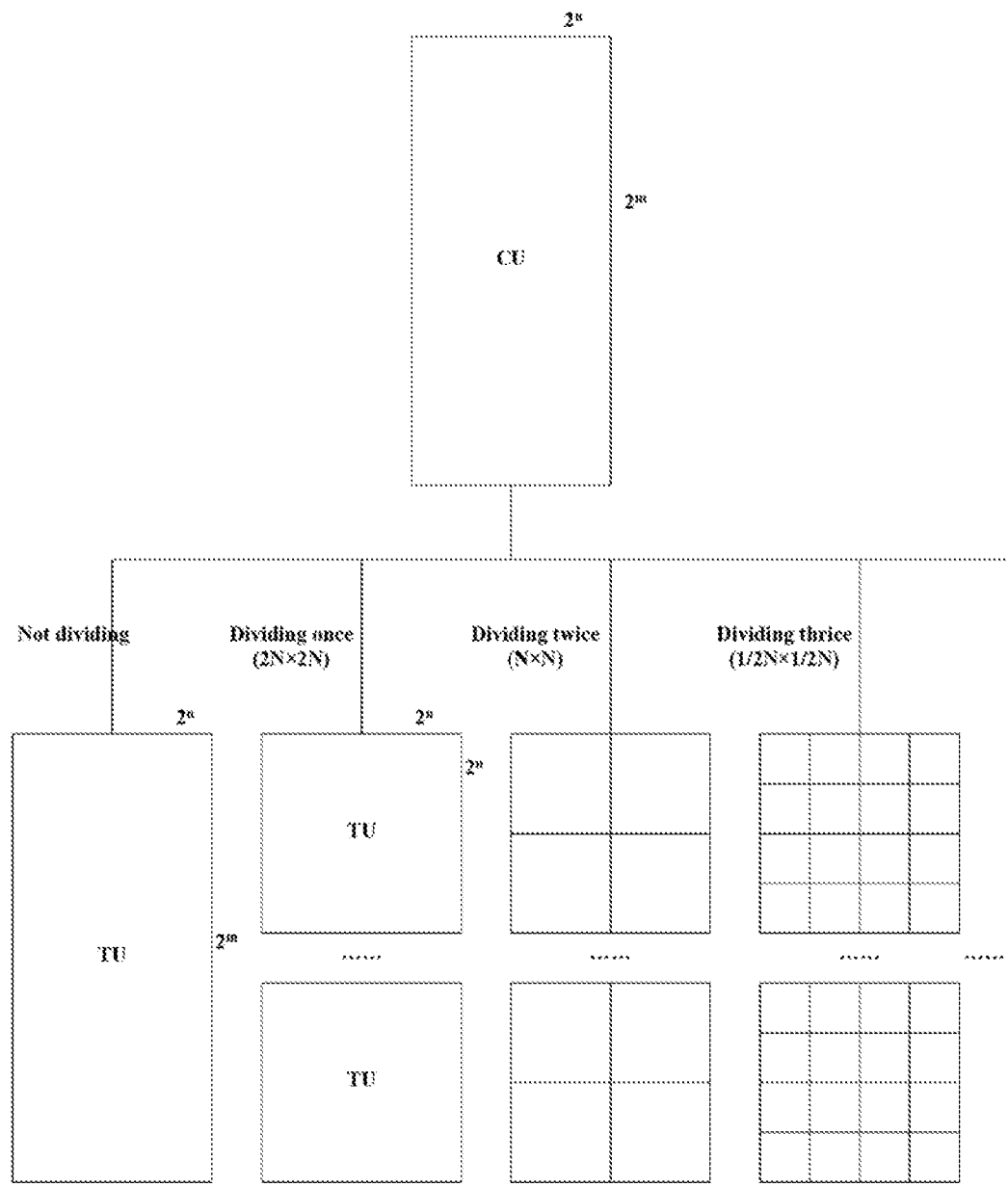
FIG. 3 is another exemplary diagram of a non-square CU of a UTU structure that is divided into one or more TUs.

FIG. 3 is another exemplary diagram of the non-square CU of a UTU structure that is divided into one or more TUs. As shown in FIG. 3, the size of the CU is $2^n \times 2^m$ (m>n), which may be directly divided into a $2^n \times 2^m$ TU (which may be referred to as being undivided), or it may also be divided into $2^{m-n}$ 2N×2N TUs (may be referred to as being divided once), or it may also be divided into $4 \times 2^{m-n}$ N×N TUs (may be referred to as being divided twice), or it may also be divided into $16 \times 2^{m-n}$ 1/2N×1/2N TUs (may be referred to as being divided thrice), and so on, until the allowed smallest TU size (such as 4×4 in HEVC).

For a future video coding technique, a maximum size of a root node used for video coding may be set to be 64×64 and a minimum size may be set to be 4×4; that is, a size of a CU may be between 64×64 and 4×4, the maximum size may be 64×64, and the minimum size may be 4×4.

In the embodiments of this disclosure, the number of UTU modes may be 4. The UTU modes may include: a first mode indicative of not dividing a CU; a second mode indicative of dividing a CU once; a third mode indicative of dividing a CU twice; and a fourth mode indicative of dividing a CU thrice. It should be noted that the embodiments of this disclosure are not limited thereto, and, for example, more or less UTU modes may be set as demanded.

In the following embodiments, utu_mode is used to denote UTU modes, and utu_mode=0 denotes the first mode, utu_mode=1 denotes the second mode, utu_mode=2 denotes the third mode, and utu_mode=3 denotes the fourth mode.

For example, a size of a CU is 64×64, and utu_mode=0 denotes that the CU is not divided and shall be transformed on a 64×64 block. For another example, a size of a CU is 64×64, and utu_mode=1 denotes that the CU is divided once; that is, the CU may be divided into four 32×32 TUs, and transform shall be performed on the four 32×32 blocks, respectively.

For another example, a size of a CU is 64×64, and utu_mode=2 denotes that the CU is divided twice; that is, the CU may be divided into four 32×32 blocks, each of the 32×32 blocks is divided into four 16×16 TUs, and transform shall be performed on the sixteen 16×16 blocks, respectively.

For a further example, a size of a CU is 32×64, and utu_mode=2 denotes that the CU is divided twice; that is, the CU may be divided into two 32×32 blocks, each of the 32×32 blocks is divided into four 16×16 TUs, and transform shall be performed on the eight 16×16 blocks, respectively. For yet a further example, a size of a CU is 4×4, and division is not needed to be performed in the CU.

A structure of the UTU and the UTU mode are illustrated above, and this disclosure shall be described below.

EMBODIMENT 1

Figure 4:
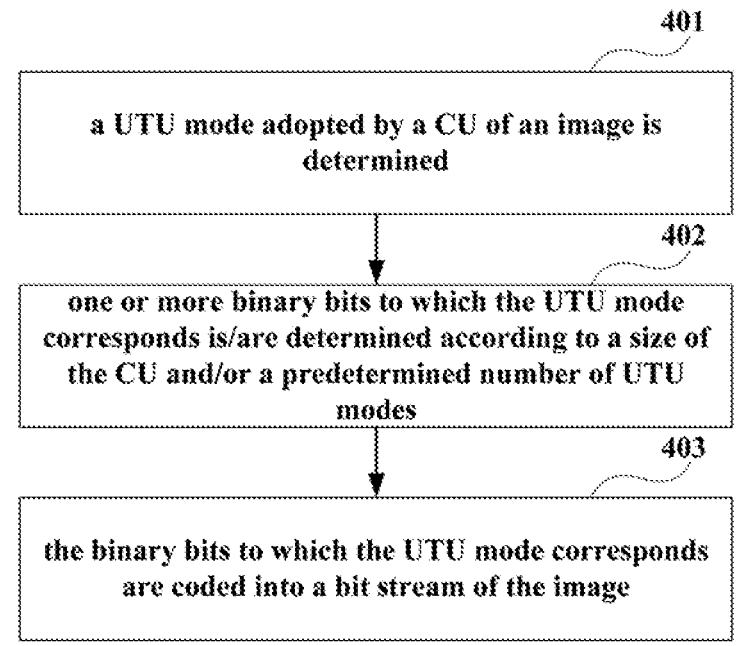
FIG. 4 is a schematic diagram of the method for coding mode information of an embodiment of this disclosure.

The embodiments of this disclosure provide a method for coding mode information. FIG. 4 is a schematic diagram of the method for coding mode information of the embodiments of this disclosure, in which a CU shall be described from a coder side. As shown in FIG. 4, the method includes:

step 401: a uniform transform unit mode adopted by a CU of an image is determined;

step 402: one or more binary bits to which the UTU mode corresponds is/are determined according to a size of the CU and/or a predetermined number of UTU modes; and step 403: the binary bits to which the UTU mode corresponds are coded into a bit stream of the image.

In an embodiment, multiple UTU modes may be predefined. For example, the above utu_mode may have values of 0, 1, 2, and 3, that is, the number of the UTU modes may also be predetermined. For a CU to be coded, a corresponding UTU mode may be determined according to the cost, such as whether utu_mode is equal to 0, 1, 2, or 3. Reference may be made to related techniques for how to determine a particular UTU mode, which shall not be described herein any further.

It should be noted that any scheme in related techniques may be adopted to achieve other bitstream coding, such as a palette, a copy type (run_type), and a copy values, etc., in an image region to be coded; however, this disclosure is not limited thereto. How to code the UTU mode information shall be illustrated below.

Figure 5:
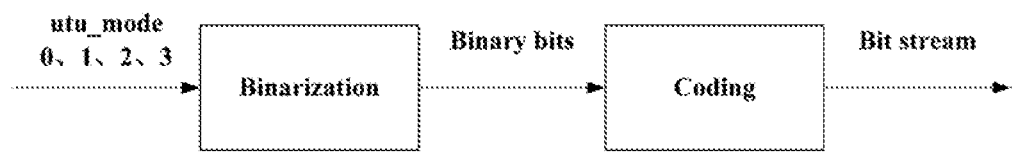
FIG. 5 is a schematic diagram of an entropy coding process of an embodiment of this disclosure.

FIG. 5 is a schematic diagram of an entropy coding process of the embodiment of this disclosure. As shown in FIG. 5, after determining a UTU mode (such as whether utu_mode is equal to 0, 1, 2, or 3), binarization may be performed on the value of the utu_mode to form one or more binary bits, and then the binary bits are coded into a bit stream by coding.

Hence, UTU mode information may be coded. How to binarize the UTU mode information in step 402 shall be further described below.

In one embodiment, the binary bits to which the uniform transform unit mode corresponds are determined as a binary sequence with a fixed length according to the value of the UTU mode and the number of the UTU modes.

For example, when the UTU mode is the first mode, the binary bit to which the UTU mode corresponds may be determined as a first value denoted by two bits (such as 00); when the UTU mode is the second mode, the binary bit to which the UTU mode corresponds may be as a second value denoted by two bits (such as 01); when the UTU mode is the third mode, the binary bit to which the UTU mode corresponds may be determined as a third value denoted by two bits (such as 10); and when the UTU mode is the fourth mode, the binary bit to which the mode corresponds may be determined as a fourth value denoted by two bits (such as 11).

For example, Table 1 exemplarily shows a case where utu_mode uses binary bits with a fixed length.

TABLE 1 utu_mode corresponding binary bits with a fixed length

| utu_mode | 0 | 1 | 2 | 3 |
|---|---|---|---|---|
| Binary bits | 00 | 01 | 10 | 11 |
| Meaning | Not dividing | Dividing once | Dividing twice | Dividing thrice |

It should be noted that Table 1 only illustrates the binary bits with a fixed length; however, this disclosure is not limited thereto. For example, when utu_mode=0, binary bits 11, or binary bits 01, and so on, may be used, as long as the binary bits may be used to distinguish the UTU modes.

In this embodiment, the UTU mode information may be coded by using, for example, two bits. Hence, not only the UTU mode information may be coded, but also bit stream costs in coding may be lowered.

In another embodiment, the binary bits to which the UTU mode corresponds may be determined as a binary sequence with a variable length according to the size of the CU, a value of the UTU mode and the number of the UTU modes.

For example, according to statistical information of utu_mode and CU size, utilization rates of utu_mode when values of utu_mode are combined with the CU size may be obtained, which are as shown in Table 2.

TABLE 2

Utilization rates of utu_mode

| CU size\utu_mode | 0 | 1 | 2 | 3 |
|---|---|---|---|---|
| 64 × 64  64 × 32  32 × 64 | 0.01% | 0.00% | 0.00% | 0.00% |
| 64 × 16  16 × 64  32 × 32  32 × 16  16 × 32 | 0.78% | 0.17% | 0.00% | 0.00% |
| 64 × 8  8 × 64  32 × 8  8 × 32  16 × 16  16 × 8  8 × 16 | 12.4% | 2.09% | 0.34% | 0.00% |
| 64 × 4  4 × 64  32 × 4  4 × 32  16 × 4  4 × 16  8 × 8  8 × 4  4 × 8 | 61.31% | 22.90% | 0.00% | 0.00% |
| 4 × 4 | 0.00% | 0.00% | 0.00% | 0.00% |

As shown in Table 2, in some cases, a utilization rate of a utu_mode may possibly be 0, that is, these situations will not occur; and furthermore, utilization rates of a utu_mode in some cases may be much higher than utilization rates thereof in some other cases. Therefore, utu_mode may be binarized according to the above usage frequency, thereby lowering the bit stream cost in coding.

In an embodiment, when the UTU mode is the first mode (such as utu_mode=0), a binary bit to which the UTU mode corresponds may be determined as 0; when the UTU mode is the second mode (such as utu_mode=1), if the size of the CU is 8×8 or a width or height of the CU is 4, a binary bit to which the UTU mode corresponds may be determined as 1; otherwise, the binary bits to which the UTU mode corresponds may be determined as 10; when the UTU mode is the third mode (such as utu_mode=2), if the size of the CU is 16×16 or a width or height of the CU is 8, the binary bits to which the UTU mode correspond may be determined as 11; otherwise, the binary bits to which the UTU mode corresponds may be determined as 110; and when the UTU mode is the fourth mode (such as utu_mode=3), the binary bits to which the UTU mode corresponds may be determined as 111.

Or, when the UTU mode is the first mode (such as utu_mode=0), a binary bit to which the UTU mode corresponds may be determined as 1; when the UTU mode is the second mode (such as utu_mode=1), if the size of the CU is 8×8 or a width or height of the CU is 4, a binary bit to which the UTU mode corresponds may be determined as 0; otherwise, the binary bit to which the UTU mode corresponds may be determined as 01; when the UTU mode is the third mode (such as utu_mode=2), if the size of the CU is 16×16 or a width or height of the CU is 8, binary bits to which the UTU mode corresponds may be determined as 00; otherwise, the binary bits to which the UTU mode corresponds may be determined as 001; and when the UTU mode is the fourth mode (such as utu_mode=3), binary bits to which the UTU mode corresponds may be determined as 000.

For example, Table 3 exemplarily shows the binary bits to which the utu_mode corresponds when values of utu_mode are combined with the CU size.

TABLE 3

| Binary bits to which the utu_mode corresponds | | | | |
|---|---|---|---|---|
| CU size\utu_mode | 0 | 1 | 2 | 3 |
| 64 × 64 64 × 32 32 × 64 | 0 | 10 | 110 | 111 |
| 64 × 16 16 × 64 32 × 32 32 × 16 16 × 32 | 0 | 10 | 110 | 111 |
| 64 × 8 8 × 64 32 × 8 8 × 32 16 × 16 16 × 8 8 × 16 | 0 | 10 | 11 | X |
| 64 × 4 4 × 64 32 × 4 4 × 32 16 × 4 4 × 16 8 × 8 × 4 4 × 8 | 0 | 1 | X | X |
| 4 × 4 | X | X | X | X |

As shown in tables 2 and 3, when the utilization rates are "61.31%" and "12.4%", etc., the utu_mode may be binarized with 1 bit (such as 0), and when the utilization rate is "22.90%", the utu_mode may be binarized with 1 bit (such as 1); therefore, in most cases, 1 bit may be used to code UTU mode information, which may lower the bit stream cost in coding.

Figure 6:
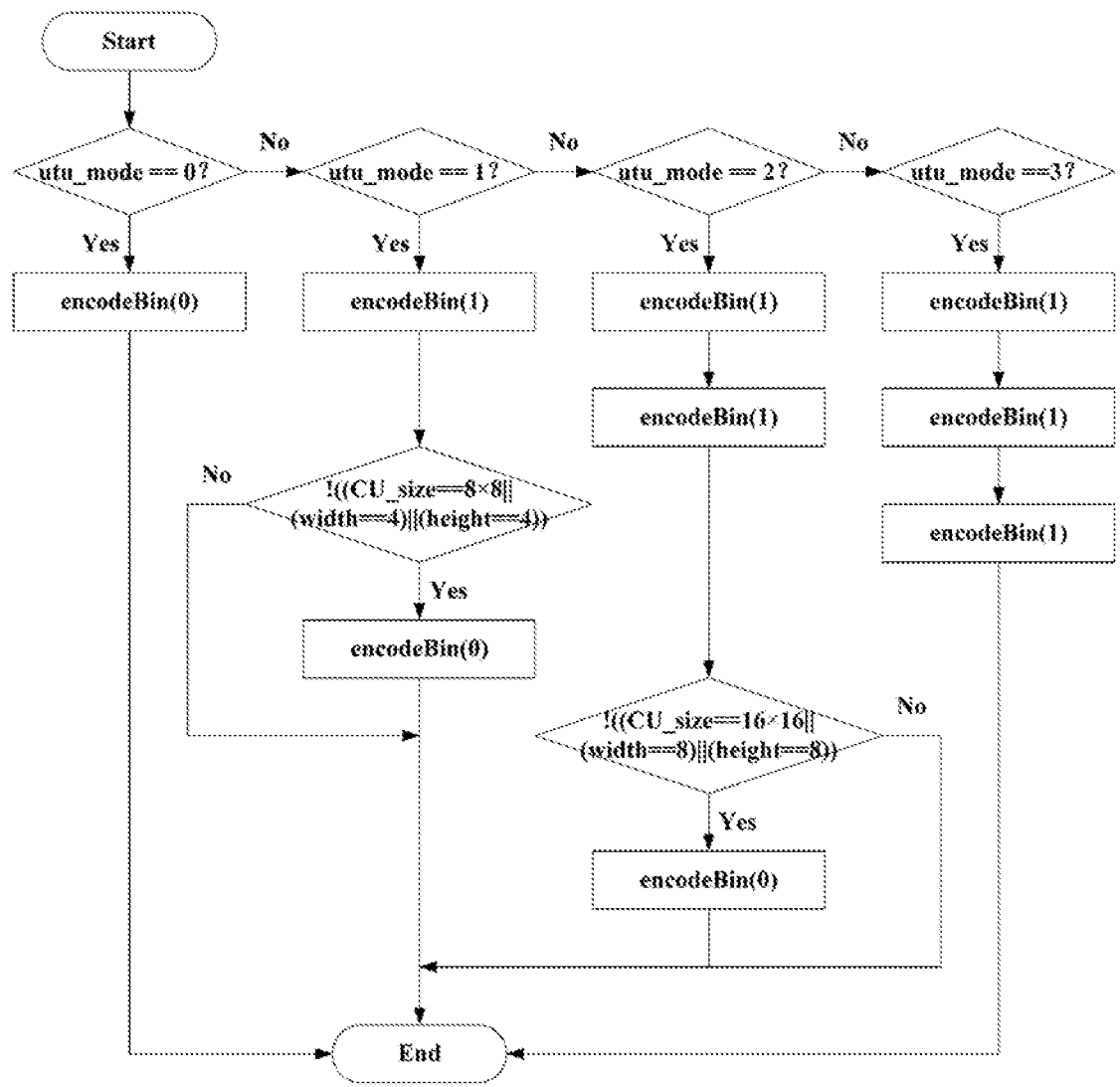
FIG. 6 is an exemplary diagram of coding lengthened binary bits of an embodiment of this disclosure.

FIG. 6 is an exemplary diagram of coding lengthened binary bits of the embodiment of this disclosure. As shown in FIG. 6, encodeBin(0) denotes that bit 0 is coded into the bit stream, and encodeBin(1) denotes that bit 1 is coded into the bit stream, CU_size denotes the size of the CU, width denotes the width of the CU, and height denotes the height of the CU.

It should be noted that FIG. 6 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 6.

In the embodiment, the UTU mode information in most cases may be coded by using, for example, 1 bit. Hence, compared with a fixed-length binary bit scheme, not only the UTU mode information may be coded, but also bitstream cost of in coding may further be lowered.

It should be noted that tables 1 and 3 only illustrate the binary bits of this disclosure; however, this disclosure is not limited thereto. And particular values of the binary bits may further be adjusted or modified by those skilled in the art as demanded according to the contents in tables 1 and 3.

Furthermore, this disclosure is schematically described above by using only one CU as an example, and multiple CUs may be coded by the above steps respectively. Steps or processes related to this disclosure have been described above; however, this disclosure is not limited thereto. And the image coding method may further include other steps or processes, and reference may be made to the relevant art for particular content of these steps or processes.

It can be seen from the above embodiments that the binary bits to which the UTU mode corresponds are determined according to the size of the CU and/or the predetermined number of UTU modes. Hence, not only uniform transform unit mode information may be coded and decoded, but also bit costs of coding may be lowered.

EMBODIMENT 2

The embodiments of this disclosure provide a method for decoding mode information.

The embodiments correspond to the method for coding mode information of Embodiment 1, with contents identical to those in Embodiment 1 being not going to be described herein any further.

Figure 7:
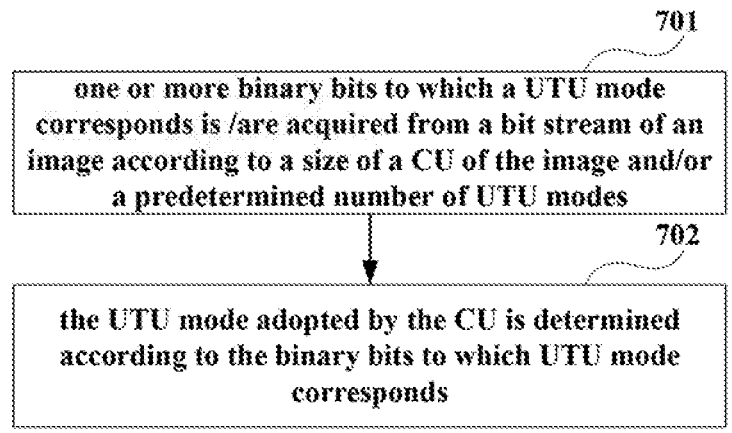
FIG. 7 is a schematic diagram of the method for decoding mode information of an embodiment of this disclosure.

FIG. 7 is a schematic diagram of the method for decoding mode information of the embodiment of this disclosure, in which a CU shall be described from a decoder side. As shown in FIG. 7, the method includes:

step 701: one or more binary bits to which a UTU mode corresponds is/are acquired from a bit stream of an image according to a size of a CU of the image and/or a predetermined number of UTU modes; and step 702: the UTU mode adopted by the CU is determined according to the binary bits to which uniform transform unit mode corresponds.

In one embodiment, the binary bits to which the UTU mode corresponds are determined as a binary sequence with a variable length according to the number of the UTU modes and bit values in the bit stream.

For example, when the bit value in the bit stream is a first value denoted by two bits (such as 00), it may be determined that the UTU mode used by the CU is the first mode (such as utu_mode=0); when the bit value in the bit stream is a second value denoted by two bits (such as 01), it may be determined that the UTU mode used by the CU is the second mode (such as utu_mode=1); when the bit value in the bit stream is a third value denoted by two bits (such as 10), it may be determined that the UTU mode used by the CU is the third mode (such as utu_mode=2); when the bit value in the bit stream is a fourth value denoted by two bits (such as 11), it may be determined that the UTU mode used by the CU is the fourth mode (such as utu_mode=3).

In another embodiment, the binary bits to which the UTU mode corresponds are determined as a binary sequence with a variable length according to the size of the CU, the number of the UTU modes and bit values in the bit stream.

For example, when a first bit value in the bit stream is 0, it may be determined that the binary bit to which the UTU mode corresponds is 0 and the UTU mode used by the CU is the first mode (such as utu_mode=0); when the first bit value in the bit stream is 1, if the size of the CU is 8×8 or a width or height of the CU is 4, it may be determined that the binary bit to which the UTU mode corresponds is 1; otherwise, it is proceeded to acquire a second bit value in the bit stream, and when the second bit value in the bit stream is 0, it may be determined that the binary bit to which the UTU mode corresponds is 10 and the UTU mode used by the CU is the second mode (such as utu_mode=1); when the second bit value in the bit stream is 1, if the size of the CU is 16×16 or a width or height of the CU is 8, it may be determined that the binary bit to which the UTU mode corresponds is 11; otherwise, it is proceeded to acquire a third bit value in the bit stream, and when the third bit value in the bit stream is 0, it may be determined that the binary bit to which the UTU mode corresponds is 110 and the UTU mode used by the CU is the third mode (such as utu_mode=2); and when the third bit value in the bit stream is 1, it may be determined that the binary bit to which the UTU mode corresponds is 111 and the UTU mode used by the CU is the fourth mode (such as utu_mode=3).

For another example, when a first bit value in the bit stream is 1, it may be determined that the binary bit to which the UTU mode corresponds is 1 and the UTU mode used by the CU is the first mode (such as utu_mode=0); when the first bit value in the bit stream is 0, if the size of the CU is 8×8 or a width or height of the CU is 4, it may be determined that the binary bit to which the UTU mode corresponds is 0; otherwise, it is proceeded to acquire a second bit value in the bit stream, and when the second bit value in the bit stream is 1, it may be determined that the binary bit to which the UTU mode corresponds is 01 and the UTU mode used by the CU is the second mode (such as utu_mode=1); when the second bit value in the bit stream is 0, if the size of the CU is 16×16 or a width or height of the CU is 8, it may be determined that the binary bit to which the UTU mode corresponds is 00; otherwise, it is proceeded to acquire a third bit value in the bit stream, and when the third bit value in the bit stream is 1, it may be determined that the binary bit to which the UTU mode corresponds is 001 and the UTU mode used by the CU is the third mode (such as utu_mode=2); and when the third bit value in the bit stream is 0, it may be determined that the binary bit to which the UTU mode corresponds is 000 and the UTU mode used by the CU is the fourth mode (such as utu_mode=3).

Figure 8:
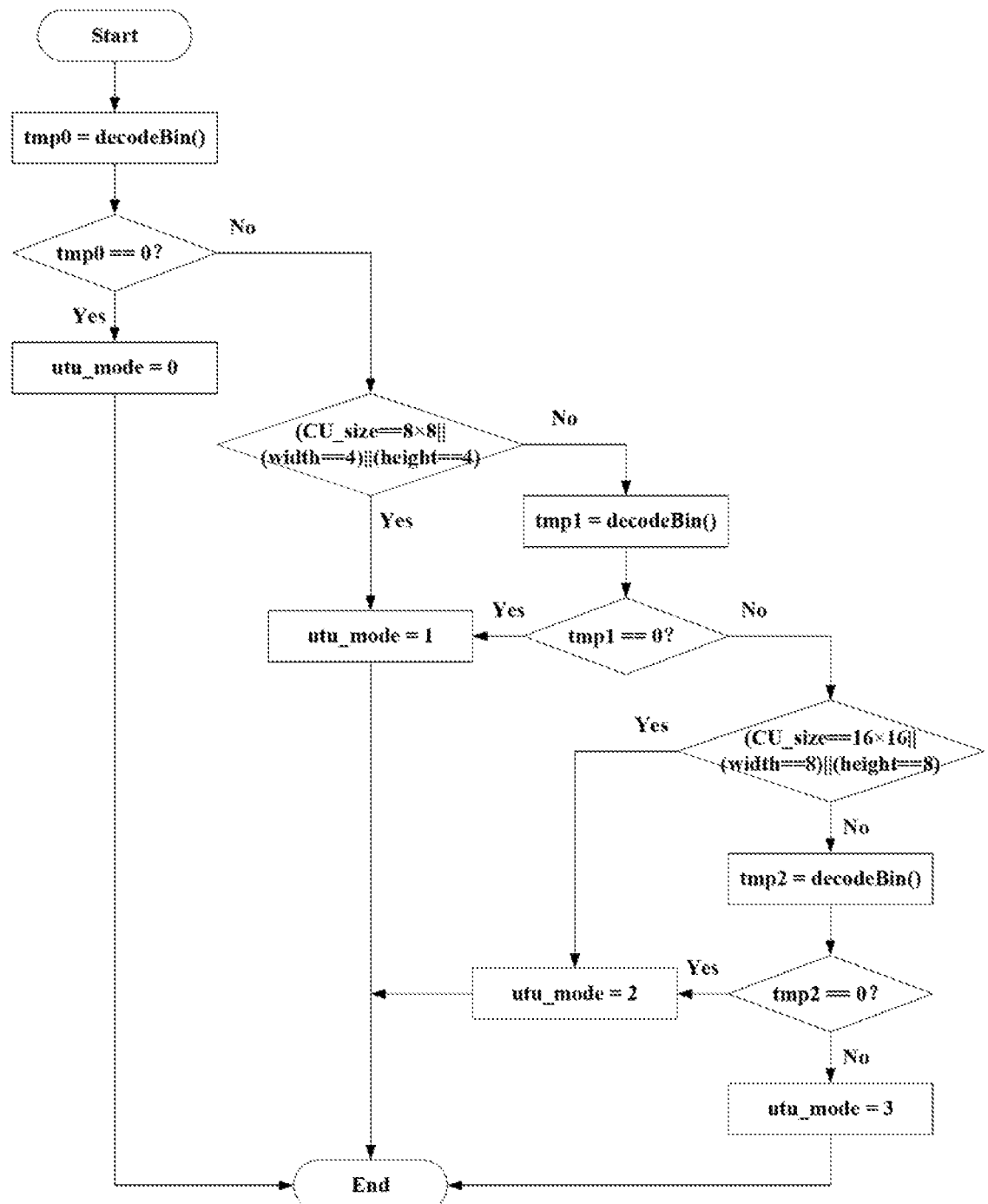
FIG. 8 is an exemplary diagram of decoding lengthened binary bits of an embodiment of this disclosure.

FIG. 8 is an exemplary diagram of decoding lengthened binary bits of the embodiment of this disclosure. As shown in FIG. 8, decodeBin( ) denotes that a current bit in the bit stream is decoded, tmp0, tmp1 and tmp2 respectively denote bit values that are read from the bit stream and temporarily stored (such as the above first bit value, second value and third value), CU_size denotes the size of the CU, width denotes the width of the CU, and height denotes the height of the CU.

It should be noted that FIG. 8 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 8.

Furthermore, this disclosure is schematically described above by using only one CU as an example, and multiple CUs may be coded by the above steps respectively. Steps or processes related to this disclosure have been described above; however, this disclosure is not limited thereto. And the image decoding method may further include other steps or processes, and reference may be made to the relevant art for particular content of these steps or processes.

It can be seen from the above embodiments that the binary bits to which the UTU mode corresponds are determined according to the size of the CU and/or the predetermined number of UTU modes. Hence, not only uniform transform unit mode information may be coded and decoded, but also bit costs of coding may be lowered.

EMBODIMENT 3

The embodiments of this disclosure provide an apparatus for coding mode information. The apparatus may be an electronic device used for image processing or video processing, and may also be one or more components or assemblies configured in an electronic device. And contents in the embodiments identical to those in Embodiment 1 shall not be described herein any further.

Figure 9:
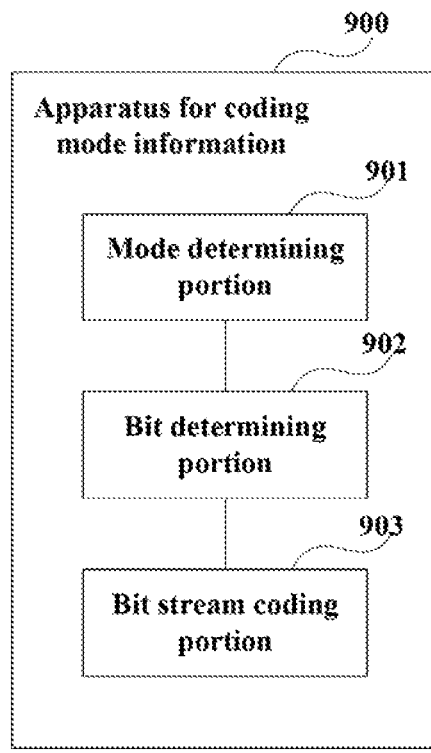
FIG. 9 is a schematic diagram of the apparatus for coding mode information of an embodiment of this disclosure.

FIG. 9 is a schematic diagram of the apparatus for coding mode information of the embodiment of this disclosure. As shown in FIG. 9, an apparatus 900 for coding mode information includes:

a mode determining portion 901 configured to determine a uniform transform unit mode adopted by a coding unit of an image;

a bit determining portion 902 configured to determine one or more binary bits to which the uniform transform unit mode corresponds according to a size of the coding unit and/or a predetermined number of uniform transform unit modes; and a bit stream coding portion 903 configured to code the binary bits to which the uniform transform unit mode corresponds into a bit stream of the image.

In an embodiment, the bit determining portion 902 may particularly be configured to determine the binary bits to which the uniform transform unit mode corresponds as a binary sequence with a variable length according to the size of the coding unit, a value of the uniform transform unit mode and the number of the uniform transform unit modes.

For example, when the uniform transform unit mode is the first mode (such as utu_mode=0), the bit determining portion 902 determines a binary bit to which the uniform transform unit mode corresponds as 0; when the uniform transform unit mode is the second mode (such as utu_mode=1), if the size of the coding unit is 8×8 or a width or height of the coding unit is 4, the bit determining portion 902 determines a binary bit to which the uniform transform unit mode corresponds as 1; otherwise, the bit determining portion 902 determines the binary bits to which the uniform transform unit mode corresponds as 10; when the uniform transform unit mode is the third mode (such as utu_mode=2), if the size of the coding unit is 16×16 or a width or height of the coding unit is 8, the bit determining portion 902 determines binary bits to which the uniform transform unit mode correspond as 11; otherwise, the bit determining portion 902 determines the binary bits to which the uniform transform unit mode corresponds as 110; and when the uniform transform unit mode is the fourth mode (such as utu_mode=3), the bit determining portion 902 determines the binary bits to which the uniform transform unit mode corresponds as 111.

For another example, when the uniform transform unit mode is the first mode (such as utu_mode=0), the bit determining portion 902 determines a binary bit to which the uniform transform unit mode corresponds as 1; when the uniform transform unit mode is the second mode (such as utu_mode=1), if the size of the coding unit is 8×8 or a width or height of the coding unit is 4, the bit determining portion 902 determines a binary bit to which the uniform transform unit mode corresponds as 0; otherwise, the bit determining portion 902 determines the binary bit to which the uniform transform unit mode corresponds as 01; when the uniform transform unit mode is the third mode (such as utu_mode=2), if the size of the coding unit is 16×16 or a width or height of the coding unit is 8, the bit determining portion 902 determines binary bits to which the uniform transform unit mode corresponds as 00; otherwise, the bit determining portion 902 determines the binary bits to which the uniform transform unit mode corresponds as 001; and when the uniform transform unit mode is the fourth mode (such as utu_mode=3), the bit determining portion 902 determines binary bits to which the uniform transform unit mode corresponds as 000.

In another embodiment, the bit determining portion 902 may particularly be configured to determine the binary bits to which the uniform transform unit mode corresponds as a binary sequence with a fixed length according to the value of the uniform transform unit mode and the number of the uniform transform unit modes.

For example, when the uniform transform unit mode is the first mode (such as utu_mode =0), the bit determining portion 902 determines the binary bits to which the uniform transform unit mode corresponds as a first value denoted by two bits (such as 00); when the uniform transform unit mode is the second mode (such as utu_mode=1), the bit determining portion 902 determines the binary bits to which the uniform transform unit mode corresponds as a second value denoted by two bits (such as 01); when the uniform transform unit mode is the third mode (such as utu_mode=2), the bit determining portion 902 determines the binary bits to which the uniform transform unit mode corresponds as a third value denoted by two bits (such as 10); and when the uniform transform unit mode is the fourth mode (such as utu_mode=3), the bit determining portion 902 determines the binary bits to which the uniform transform unit mode corresponds as a fourth value denoted by two bits (such as 11).

Furthermore, for the sake of simplicity, connection relationships between the components or modules or signal profiles thereof are only illustrated in FIG. 9. However, it should be understood by those skilled in the art that such related techniques as bus connection, etc., may be adopted. And the above components or modules may be implemented by hardware, such as a processor, and a memory, etc., which are not limited in the embodiment of this disclosure.

It should be noted that the components or modules related to this disclosure are only described above; however, this disclosure is not limited thereto. For example, the apparatus 900 for coding mode information may further include other components or modules, and reference may be made to related techniques for particulars of these components or modules.

It can be seen from the above embodiments that the binary bits to which the UTU mode corresponds are determined according to the size of the CU and/or the predetermined number of UTU modes. Hence, not only uniform transform unit mode information may be coded and decoded, but also bit costs of coding may be lowered.

EMBODIMENT 4

The embodiments of this disclosure provide an apparatus for decoding mode information. The apparatus may be an electronic device used for image processing or video processing, and may also be one or more components or assemblies configured in an electronic device. And contents in the embodiments identical to those in Embodiment 2 shall not be described herein any further.

Figure 10:
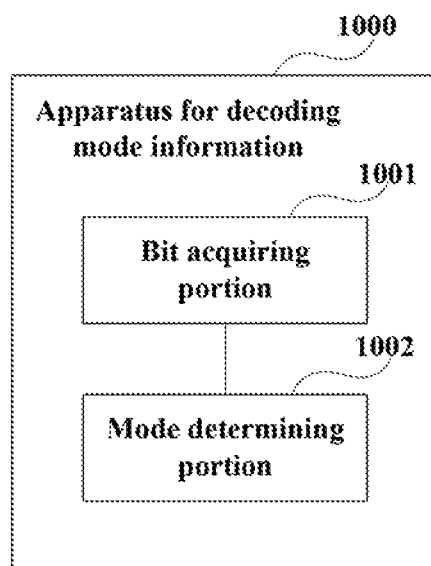
FIG. 10 is a schematic diagram of the apparatus for decoding mode information of an embodiment of this disclosure.

FIG. 10 is a schematic diagram of the apparatus for decoding mode information of the embodiment of this disclosure. As shown in FIG. 10, an apparatus 1000 for decoding mode information includes: a bit acquiring portion 1001 configured to acquire one or more binary bits to which a uniform transform unit mode corresponds from a bit stream of an image according to a size of a coding unit of the image and/or a predetermined number of uniform transform unit modes; and a mode determining portion 1002 configured to determine the uniform transform unit mode adopted by the coding unit according to the binary bits to which uniform transform unit mode corresponds.

In an embodiment, the bit acquiring portion 1001 may particularly be configured to determine the binary bits to which the uniform transform unit mode corresponds as a binary sequence with a variable length according to the size of the coding unit, the number of the uniform transform unit modes and bit values in the bit stream.

For example, when a first bit value in the bit stream is 0, the bit acquiring portion 1001 determines a binary bit to which the uniform transform unit mode corresponds as 0, and the mode determining portion 1002 determines that a uniform transform unit mode adopted by the coding unit is the first mode (such as utu_mode=0).

When the first bit value in the bit stream is 1, if the size of the coding unit is 8×8 or a width or height of the coding unit is 4, the bit acquiring portion 1001 determines a binary bit to which the uniform transform unit mode corresponds as 1; otherwise, the bit acquiring portion 1001 continues to acquire a second bit value in the bit stream, and when the second bit value in the bit stream is 0, the bit acquiring portion 1001 determines binary bits to which the uniform transform unit mode corresponds as 10, and the mode determining portion 1002 determines that a uniform transform unit mode adopted by the coding unit is the second mode (such as utu_mode=1).

When the second bit value in the bit stream is 1, if the size of the coding unit is 16×16 or the width or height of the coding unit is 8, the bit acquiring portion 1001 determines binary bits to which the uniform transform unit mode corresponds as 11; otherwise, the bit acquiring portion 1001 continues to acquire a third bit value in the bit stream, and when the third bit value in the bit stream is 0, the bit acquiring portion 1001 determines binary bits to which the uniform transform unit mode corresponds as 110, and the mode determining portion 1002 determines that a uniform transform unit mode adopted by the coding unit is the third mode (such as utu_mode=2).

When the third bit value in the bit stream is 1, the bit acquiring portion 1001 determines binary bits to which the uniform transform unit mode corresponds as 111, and the mode determining portion 1002 determines that a uniform transform unit mode adopted by the coding unit is the fourth mode (such as utu_mode=3).

For another example, when the first bit value in the bit stream is 1, the bit acquiring portion 1001 determines a binary bit to which the uniform transform unit mode corresponds as 1, and the mode determining portion 1002 determines that a uniform transform unit mode adopted by the coding unit is the first mode (such as utu_mode=0).

When the first bit value in the bit stream is 0, if the size of the coding unit is 8×8 or a width or height of the coding unit is 4, the bit acquiring portion 1001 determines a binary bit to which the uniform transform unit mode corresponds as 0; otherwise, the bit acquiring portion 1001 continues to acquire a second bit value in the bit stream, and when the second bit value in the bit stream is 1, the bit acquiring portion 1001 determines binary bits to which the uniform transform unit mode corresponds as 01, and the mode determining portion 1002 determines that a uniform transform unit mode adopted by the coding unit is the second mode (such as utu_mode=1).

When the second bit value in the bit stream is 0, if the size of the coding unit is 16×16 or the width or height of the coding unit is 8, the bit acquiring portion 1001 determines binary bits to which the uniform transform unit mode corresponds as 00; otherwise, the bit acquiring portion 1001 continues to acquire a third bit value in the bit stream, and when the third bit value in the bit stream is 1, the bit acquiring portion 1001 determines binary bits to which the uniform transform unit mode corresponds as 001, and the mode determining portion 1002 determines that a uniform transform unit mode adopted by the coding unit is the third mode (such as utu_mode=2).

When the third bit value in the bit stream is 0, the bit acquiring portion 1001 determines binary bits to which the uniform transform unit mode corresponds as 000, and the mode determining portion 1002 determines that a uniform transform unit mode adopted by the coding unit is the fourth mode (such as utu_mode=3).

In another embodiment, the bit acquiring portion 1001 may particularly be configured to determine the binary bits to which the uniform transform unit mode corresponds as a binary sequence with a fixed length according to the number of the uniform transform unit modes and bit values in the bit stream.

For example, when the bit values in the bit stream are a first value denoted by two bits (such as 00), the mode determining portion 1002 determines that a uniform transform unit mode adopted by the coding unit is the first mode; when the bit values in the bit stream are a second value denoted by two bits (such as 01), the mode determining portion 1002 determines that a uniform transform unit mode adopted by the coding unit is the second mode; when the bit values in the bit stream are a third value denoted by two bits (such as 10), the mode determining portion 1002 determines that a uniform transform unit mode adopted by the coding unit is the third mode; and when the bit values in the bit stream are a fourth value denoted by two bits (such as 11), the mode determining portion 1002 determines that a uniform transform unit mode adopted by the coding unit is the fourth mode.

Furthermore, for the sake of simplicity, connection relationships between the components or modules or signal profiles thereof are only illustrated in FIG. 10. However, it should be understood by those skilled in the art that such related techniques as bus connection, etc., may be adopted. And the above components or modules may be implemented by hardware, such as a processor, and a memory, etc., which are not limited in the embodiment of this disclosure.

It should be noted that the components or modules related to this disclosure are only described above; however, this disclosure is not limited thereto. The apparatus 1000 for decoding mode information may further include other components or modules, and reference may be made to related techniques for particulars of these components or modules.

It can be seen from the above embodiments that the binary bits to which the UTU mode corresponds are determined according to the size of the CU and/or the predetermined number of UTU modes. Hence, not only uniform transform unit mode information may be decoded, but also bit costs of coding may be lowered.

EMBODIMENT 5

The embodiments of this disclosure provide an electronic device. The electronic device performs image processing or video processing, and includes a coder and/or a decoder, the coder includes the apparatus for coding mode information as described in Embodiment 3, and the decoder includes the apparatus for decoding mode information as described in Embodiment 4.

Figure 11:
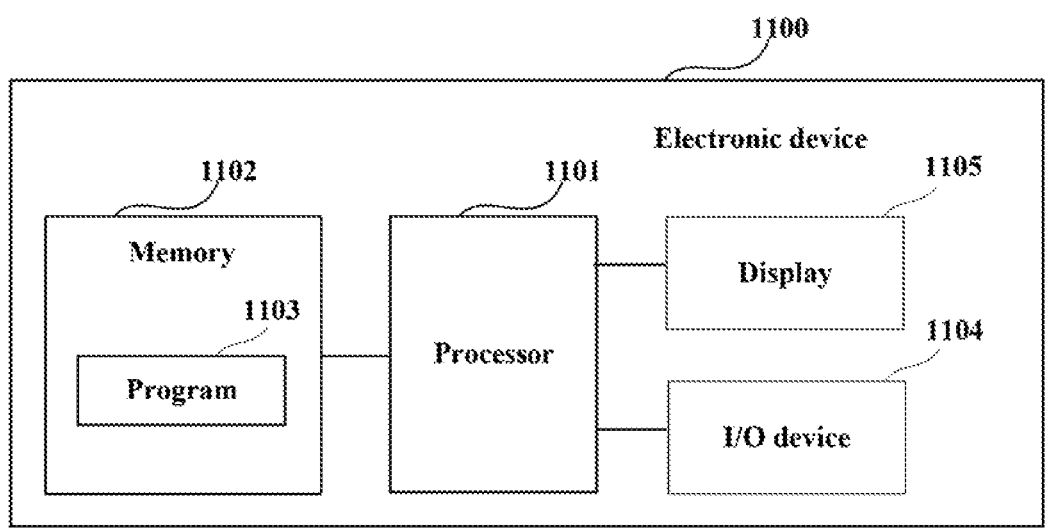
FIG. 11 is a schematic diagram of the electronic device of an embodiment of this disclosure.

FIG. 11 is a schematic diagram of the electronic device of the embodiment of this disclosure. As shown in FIG. 11, an electronic device 1100 may include a processor 1101 and a memory 1102, the memory 1102 being coupled to the processor 1101. The memory 1102 may store various data, and furthermore, it may store a program 1103 for information processing, and execute the program 1103 under control of the processor 1101.

In one embodiment, the electronic device 1100 may be used as a coder, and functions of the apparatus 900 for coding mode information may be integrated into the processor 1101. The processor 1101 may be configured to carry out the method for coding mode information described in Embodiment 1.

For example, the processor 1101 may be configured to execute the following control: determining a uniform transform unit mode adopted by a coding unit of an image; determining one or more binary bits to which the uniform transform unit mode corresponds according to a size of the coding unit and/or a predetermined number of uniform transform unit modes; and coding the binary bits to which the uniform transform unit mode corresponds into a bit stream of the image.

In another embodiment, the electronic device 1100 may be used as a decoder, and functions of the apparatus 1000 for decoding mode information may be integrated into the processor 1101. The processor 1101 may be configured to carry out the method for decoding mode information described in Embodiment 2.

For example, the processor 1101 may be configured to execute the following control:

acquiring one or more binary bits to which a uniform transform unit mode corresponds from a bit stream of an image according to a size of a coding unit of the image and/or a predetermined number of uniform transform unit modes; and determining the uniform transform unit mode adopted by the coding unit according to the binary bits to which uniform transform unit mode corresponds.

Furthermore, as shown in FIG. 11, the electronic device 1100 may include an input/output (I/O) device 1104, and a display 1105, etc. Functions of the above components are similar to those in the relevant art, and shall not be described herein any further. It should be noted that the electronic device 1100 does not necessarily include all the parts shown in FIG. 11, and furthermore, the electronic device 1100 may include parts not shown in FIG. 11, and the relevant art may be referred to.

An embodiment of the present disclosure provides a computer readable program code, which, when executed in a coder or an electric device, will cause the coder or the electric device to carry out the method for coding mode information described in Embodiment 1.

An embodiment of the present disclosure provides a computer storage medium, including a computer readable program code, which will cause a coder or an electric device to carry out the method for coding mode information described in Embodiment 1.

An embodiment of the present disclosure provides a computer readable program code, which, when executed in a decoder or an electric device, will cause the decoder or the electric device to carry out the method for decoding mode information described in Embodiment 2.

An embodiment of the present disclosure provides a computer storage medium, including a computer readable program code, which will cause a decoder or an electric device to carry out the method for decoding mode information described in Embodiment 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The software modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGs may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. An apparatus to code mode information, comprising:
a processor to couple to a memory and to,
   determine a uniform transform block mode adopted by a coding block of an image;
   determine a binary bit to which the uniform transform unit mode corresponds, according to a size of the coding block of the image and/or a determined number of uniform transform block modes; and
   code the binary bit to which the uniform transform block mode corresponds into a bit stream of the image,
   wherein the processor is to determine the binary bit to which the uniform transform block mode corresponds as a binary sequence with a variable length, according to the size of the coding block, a value of the uniform transform bock mode and the determined number of the uniform transform block modes;
   wherein the determined number of the uniform transform block modes is at least 2, and the uniform transform block modes includes,
      a first mode indicative of not dividing the coding block; and
      a second mode indicative of dividing the coding block once.

2. The apparatus according to claim 1, wherein the determined number of the uniform transform block modes is 4, and the uniform transform block modes further comprise:
   a third mode indicative of dividing the coding block twice; and
   a fourth mode indicative of dividing the coding block thrice.

3. The apparatus according to claim 2, wherein the uniform transform block modes include utu_modes; and
   among the utu_modes, utu_mode=0 denotes the first mode, utu_mode=1 denotes the second mode, utu_mode=2 denotes the third mode, and utu_mode=3 denotes the fourth mode.

4. The apparatus according to claim 2, wherein,
   when the uniform transform block mode is the first mode, the processor is to determine the binary bit to which the uniform transform block mode corresponds as 0;
   when the uniform transform block mode is the second mode, if the size of the coding block is 8×8 or a width or height of the coding block is 4, the processor is to determine the binary bit to which the uniform transform block mode corresponds as 1, and otherwise, the processor is to determine the binary bit to which the uniform transform block mode corresponds as 10;
   when the uniform transform block mode is the third mode, if the size of the coding block is 16×16, or a width or height of the coding block is 8, the processor is to determine the binary bit to which the uniform transform block mode corresponds as 11, and if the size of the coding block is other than 16×16, or the width or height of the coding block is other than 8, the processor is to determine the binary bit to which the uniform transform block mode corresponds as 110; and
   when the uniform transform block mode is the fourth mode, the processor is to determine the binary bit to which the uniform transform block mode corresponds as 111.

5. The apparatus according to claim 2, wherein,
   when the uniform transform block mode is the first mode, the processor is to determine the binary bit to which the uniform transform block mode corresponds as 1;

when the uniform transform block mode is the second mode, if the size of the coding block is 8×8, or a width or height of the coding block is 4, the processor is to determine the binary bit to which the uniform transform bock mode corresponds as 0, and if the size of the coding block is other than 8×8, or the width or height of the coding block is other than 4, the processor is to determine the binary bit to which the uniform transform block mode corresponds as 01;

when the uniform transform block mode is the third mode, if the size of the coding block is 16×16, or a width or height of the coding block is 8, the processor is to determine the binary bit to which the uniform transform block mode corresponds as 00, and if the size of the coding block is other than 16×16, or the width or height of the coding block is other than 8, the processor is to determine the binary bit to which the uniform transform block mode corresponds as 001; and when the uniform transform block mode is the fourth mode, the processor is to determine the binary bit to which the uniform transform block mode corresponds as 000.

6. An apparatus to code mode information, comprising:
a processor to couple to a memory and to,
determine a uniform transform block mode adopted by a coding block of an image;
determine a binary bit to which the uniform transform unit mode corresponds, according to a determined number of uniform transform block modes; and
code the binary bit to which the uniform transform block mode corresponds into a bit stream of the image,
wherein the processor is to determine the binary bit to which the uniform transform block mode corresponds as a binary sequence with a fixed length, according to a value of the uniform transform block mode and the determined number of the uniform transform block modes,
wherein the determined number of the uniform transform block modes is at least 2, and the uniform transform block modes include,
a first mode indicative of not dividing the coding block; and
a second mode indicative of dividing the coding block once.

7. The apparatus according to claim 6, wherein the determined number of the uniform transform block modes is 4, and the uniform transform block modes further comprise:
a third mode indicative of dividing the coding block twice; and
a fourth mode indicative of dividing the coding block thrice.

8. The apparatus according to claim 7, wherein,
when the uniform transform block mode is the first mode, the processor is to determine the binary bit to which the uniform transform block mode corresponds as a first value denoted by two bits;
when the uniform transform block mode is the second mode, the processor is to determine the binary bit to which the uniform transform block mode corresponds as a second value denoted by two bits;
when the uniform transform block mode is the third mode, the processor is to determine the binary bit to which the uniform transform block mode corresponds as a third value denoted by two bits; and
when the uniform transform block mode is the fourth mode, the processor is to determine the binary bit to which the uniform transform block mode corresponds as a fourth value denoted by two bits.

9. An apparatus to decode mode information, comprising:
a processor to couple to a memory and to,
acquire a binary bit to which a uniform transform block mode corresponds from a bit stream of an image, according to a size of a coding block of the image and/or a determined number of uniform transform block modes; and
determine the uniform transform block mode adopted by the coding block according to the binary bit to which uniform transform block mode corresponds,
wherein the processor is to determine the binary bit to which the uniform transform block mode corresponds as a binary sequence with a variable length, according to the size of the coding block, the determined number of the uniform transform block modes and bit values in the bit stream;
wherein the determined number of the uniform transform block modes is at least 2, and the uniform transform block modes include,
a first mode indicative of not dividing the coding block; and
a second mode indicative of dividing the coding block once.

10. The apparatus according to claim 9, wherein the determined number of the uniform transform block modes is 4, and the uniform transform block modes further comprise:
a third mode indicative of dividing the coding block twice; and
a fourth mode indicative of dividing the coding block thrice.

11. The apparatus according to claim 10, wherein the uniform transform block modes include utu_modes; and
among the utu_modes, utu_mode=0 denotes the first mode, utu_mode=1 denotes the second mode, utu_mode=2 denotes the third mode, and utu_mode=3 denotes the fourth mode.

12. The apparatus according to claim 10, wherein,
when a first bit value in the bit stream is 0, the processor is to determine the binary bit to which the uniform transform block mode corresponds as 0, and the processor is to determine that a uniform transform block mode adopted by the coding block is the first mode;
when the first bit value in the bit stream is 1, if the size of the coding block is 8×8, or a width or height of the coding block is 4, the processor is to determine the binary bit to which the uniform transform block mode corresponds as 1, and if the size of the coding block is other than 8×8, or a width or height of the coding block is other than 4, the processor is to continue to acquire a second bit value in the bit stream, and when the second bit value in the bit stream is 0, the processor is to determine the binary bit to which the uniform transform block mode corresponds as 10, and the processor is to determine that a uniform transform block mode adopted by the coding block is the second mode;
when the second bit value in the bit stream is 1, if the size of the coding block is 16×16, or the width or height of the coding block is 8, the processor is to determine the binary bit to which the uniform transform block mode corresponds as 11, and if the size of the coding block is other than 16×16, or the width or height of the coding block is other than 8, the processor is to continue to acquire a third bit value in the bit stream, and when the third bit value in the bit stream is 0, the processor is to determine the binary bit to which the uniform transform block mode corresponds as 110, and the processor is to determine that a uniform transform block mode adopted by the coding block is the third mode; and when the third bit value in the bit stream is 1, the processor is to determine the binary bit to which the uniform transform block mode corresponds as 111, and the processor is to determine that a uniform transform block mode adopted by the coding block is the fourth mode.

13. The apparatus according to claim 10, wherein, when the first bit value in the bit stream is 1, the processor is to determine the binary bit to which the uniform transform block mode corresponds as 1, and the processor is to determine that a uniform transform block mode adopted by the coding block is the first mode;

when the first bit value in the bit stream is 0, if the size of the coding block is 8×8, or a width or height of the coding block is 4, the processor is to determine the binary bit to which the uniform transform block mode corresponds as 0, and if the size of the coding block is other than 8×8, or a width or height of the coding block is other than 4, the processor is to continue to acquire a second bit value in the bit stream, and when the second bit value in the bit stream is 1, the processor is to determine the binary bit to which the uniform transform block mode corresponds as 01, and the processor is to determine that a uniform transform block mode adopted by the coding block is the second mode;

when the second bit value in the bit stream is 0, if the size of the coding block is 16×16, or the width or height of the coding block is 8, the processor is to determine the binary bit to which the uniform transform block mode corresponds as 00, and if the size of the coding block is other than 16×16, or the width or height of the coding block is other than 8, the processor is to continue to acquire a third bit value in the bit stream, and when the third bit value in the bit stream is 1, the processor is to determine the binary bit to which the uniform transform block mode corresponds as 001, and the processor is to determine that a uniform transform block mode adopted by the coding block is the third mode; and when the third bit value in the bit stream is 0, the processor is to determine the binary bit to which the uniform transform block mode corresponds as 000, and the processor is to determine that a uniform transform block mode adopted by the coding block is the fourth mode.

14. An apparatus to decode mode information, comprising:

a processor to couple to a memory and to,
acquire a binary bit to which a uniform transform block mode corresponds from a bit stream of an image, according to a determined number of uniform transform block modes; and
determine the uniform transform block mode adopted by the coding block according to the binary bit to which uniform transform block mode corresponds,
wherein the processor is to determine the binary bit to which the uniform transform block mode corresponds as a binary sequence with a fixed length, according to the determined number of the uniform transform block modes and bit values in the bit stream,
wherein the determined number of the uniform transform block modes is at least 2, and the uniform transform block modes includes,
a first mode indicative of not dividing the coding block; and
a second mode indicative of dividing the coding block once.

15. The apparatus according to claim 14, wherein the determined number of the uniform transform block modes is 4, and the uniform transform block modes further comprise:
a third mode indicative of dividing the coding block twice; and
a fourth mode indicative of dividing the coding block thrice.

16. The apparatus according to claim 15, wherein,
when the bit values in the bit stream are a first value denoted by two bits, the processor is to determine that a uniform transform block mode adopted by the coding block is the first mode;
when the bit values in the bit stream are a second value denoted by two bits, the processor is to determine that a uniform transform block mode adopted by the coding block is the second mode;
when the bit values in the bit stream are a third value denoted by two bits, the processor is to determine that a uniform transform unit mode adopted by the coding block is the third mode; and
when the bit values in the bit stream are a fourth value denoted by two bits, the processor is to determine that a uniform transform block mode adopted by the coding block is the fourth mode.

17. An electronic device, comprising:
a coder to code mode information, the coder including:
a processor to couple to a memory and to,
determine a uniform transform block mode adopted by a coding block of an image;
determine a binary bit to which the uniform transform unit mode corresponds, according to a size of the coding block of the image and/or a determined number of uniform transform block modes; and
code the binary bit to which the uniform transform block mode corresponds into a bit stream of the image;
wherein the processor is to determine the binary bit to which the uniform transform block mode corresponds as a binary sequence with a variable length, according to the size of the coding block, a value of the uniform transform bock mode and the determined number of the uniform transform block modes,
wherein the determined number of the uniform transform block modes is at least 2, and the uniform transform block modes include,
a first mode indicative of not dividing the coding block; and
a second mode indicative of dividing the coding block once; and/or
a decoder to decode mode information, the decoder including:
a processor to couple to a memory and to,
acquire a binary bit to which a uniform transform block mode corresponds from a bit stream of an image, according to a size of a coding block of the image and/or a determined number of uniform transform block modes; and determine the uniform transform block mode adopted by the coding block according to the binary bit to which uniform transform block mode corresponds, wherein the processor is to determine the binary bit to which the uniform transform block mode corresponds as a binary sequence with a variable length, according to the size of the coding block, the determined number of the uniform transform block modes and bit values in the bit stream;

wherein the determined number of the uniform transform block modes is at least, and the uniform transform block modes include, a first mode indicative of not dividing the coding block; and a second mode indicative of dividing the coding block once.

18. An electronic device, comprising:

a coder to code mode information, the coder including:

a processor to couple to a memory and to, determine a uniform transform block mode adopted by a coding block of an image;

determine a binary bit to which the uniform transform unit mode corresponds, according to a determined number of uniform transform block modes; and code the binary bit to which the uniform transform block mode corresponds into a bit stream of the image;

wherein the processor is to determine the binary bit to which the uniform transform block mode corresponds as a binary sequence with a fixed length, according to a value of the uniform transform block mode and the determined number of the uniform transform block modes;

wherein the determined number of the uniform transform block modes is at least 2, and the uniform transform block modes include, a first mode indicative of not dividing the coding block; and a second mode indicative of dividing the coding block once; and/or a decoder to decode mode information, the decoder including:

a processor to couple to a memory and to, acquire a binary bit to which a uniform transform block mode corresponds from a bit stream of an image, according to a determined number of uniform transform block modes; and determine the uniform transform block mode adopted by the coding block according to the binary bit to which uniform transform block mode corresponds;

wherein the processor is to determine the binary bit to which the uniform transform block mode corresponds as a binary sequence with a fixed length, according to the determined number of the uniform transform block modes and bit values in the bit stream;

wherein the determined number of the uniform transform block modes is at least 2, and the uniform transform block modes include, a first mode indicative of not dividing the coding block; and a second mode indicative of dividing the coding block once.

* * * * *